US007085784B2

(12) United States Patent
Krishna et al.

(10) Patent No.: US 7,085,784 B2
(45) Date of Patent: Aug. 1, 2006

(54) SYSTEM AND METHOD FOR ELIMINATING DUPLICATE COPIES OF ACTIVITY HISTORY LOGS IN BRIDGING TWO OR MORE BACKEND DATABASE SYSTEMS

(75) Inventors: Vikas Krishna, San Jose, CA (US); Hovey Raymond Strong, Jr., San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 543 days.

(21) Appl. No.: 10/044,646

(22) Filed: Jan. 10, 2002

(65) Prior Publication Data

US 2003/0131004 A1 Jul. 10, 2003

(51) Int. Cl.
*G06F 12/00* (2006.01)
(52) U.S. Cl. ............................. 707/204; 707/2; 707/3; 707/10
(58) Field of Classification Search .................. 707/2, 707/3, 10, 203, 204
See application file for complete search history.

(56) References Cited

U.S. PATENT DOCUMENTS

| 4,878,167 | A | | 10/1989 | Kapulka et al. |
| 5,321,832 | A | | 6/1994 | Tanaka et al. |
| 5,434,994 | A | | 7/1995 | Shaheen et al. |
| 5,481,694 | A | | 1/1996 | Chao et al. |
| 5,632,027 | A | | 5/1997 | Martin et al. |
| 5,903,646 | A | * | 5/1999 | Rackman ..................... 705/51 |
| 5,946,718 | A | | 8/1999 | Green |
| 6,226,650 | B1 | * | 5/2001 | Mahajan et al. ............. 707/201 |
| 6,581,075 | B1 | * | 6/2003 | Guturu et al. .............. 707/201 |

FOREIGN PATENT DOCUMENTS

JP 8077053 3/1996

OTHER PUBLICATIONS

Microsoft Press, Computer Dictionary Third Edition, Published by Microsoft Press, copyright 1997, p. 129.*
Reid, D.J., Orlowska, M.E., "The Propagation of Updates to Relational Tables in a Distributed Database System," Department of Computer Science, Queensland University, St. Lucia, Qld., Australia, Mathematical and Computer Modelling, vol. 23, No. 3, pp. 15-25, Feb. 1996. (Abstract Only).

(Continued)

*Primary Examiner*—Shahid Alam
*Assistant Examiner*—Hung Pham
(74) *Attorney, Agent, or Firm*—Jon A. Gibbons; Fleit, Kain, Gibbons, Gutman, Bongini & Bianco P.L.

(57) ABSTRACT

A system, method, and computer readable medium for control and synchronization of data between collaborative database systems. These databases are not exact duplicates and in face involve locally private data. The data is shared at the discretion of a local database and can happen during times of low system or communication demand. The use of merging a particular text string into one of the database fields after data is sent between systems is used to tag the synchronization. No time stamps or similar dating is used. This enables no addition to the data fields that are in use between the database. Care is taken to assure timely and correct synchronization while not sending data that has already been sent.

18 Claims, 8 Drawing Sheets

OTHER PUBLICATIONS

Seguin, J.,. Sergeant, G., Wilms, P., "A Majority Consensus Algorithm for the Consistency of Duplicated and Distributed Information," CICG, Grenoble, France, Journal of Digital Systems, vol. 5, No. 1-2, pp. 103-124, Spring-Summer 1981. (Abstract Only).

* cited by examiner

WORK_HISTORY AT DATABASE # 1

600

| WORK_ID | PROBLEM_ID | WORK_HISTORY |
|---|---|---|
| 1 | ABC | OPEN TICKET FOR ANALYSIS |
| 2 | ABC | SOLVE TICKET ABC |
| 3 | ABC | COPY IN SYSTEM # N |
| 4 | ABC | REOPEN ABC FOR REVIEW |
| 5 | ABC | COPY IN SYSTEM # N |
| 6 | ABC | DO NOT BOTHER WILL WORK ON ABC @ #N |
| 7 | ABC | COPY IN SYSTEM # N |
| 8 | ABC | SOLVED ! |
| 9 | ABC | COPY IN SYSTEM #N |

WORK_HISTORY AT DATABASE # N

650

| WORK_ID | PROBLEM_ID | WORK_HISTORY |
|---|---|---|
| 1 | ABC | OPEN TICKET FOR ANALYSIS |
| 2 | ABC | SOLVE TICKET ABC |
| 3 | ABC | COPY IN SYSTEM #1 |
| 4 | ABC | REOPEN ABC FOR REVIEW |
| 5 | ABC | COPY IN SYSTEM #1 |
| 6 | ABC | DO NOT BOTHER WILL WORK ON ABC @#N |
| 7 | ABC | COPY IN SYSTEM #1 |
| 8 | ABC | SOLVED ! |
| 9 | ABC | COPY IN SYSTEM #1 |

SYSTEM AND METHOD FOR ELIMINATING DUPLICATE COPIES OF ACTIVITY HISTORY LOGS IN BRIDGING TWO OR MORE BACKEND DATABASE SYSTEMS

PARTIAL WAIVER OF COPYRIGHT

All of the material in this patent application is subject to copyright protection under the copyright laws of the United States and of other countries. As of the first effective filing date of the present application, this material is protected as unpublished material. However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

CROSS REFERENCE TO RELATED APPLICATIONS

Not Applicable

BACKGROUND OF THE INVENTION

1. Field of the Invention

This invention generally relates to the field of database management, and more particularly to a system and method for the efficient control of updates between multiple copies of a database.

2. Description of the Related Art

Databases and database management are widely used in businesses today. Database software organizes collections of data so that its contents can easily be accessed, managed, and updated. One widely used type of database is the relational database. This is a tabular database in which data is defined so that it can be reorganized and accessed in a number of different ways. With networked computers and in particular the Internet there is high usage of distributed databases. The databases are dispersed or replicated among different points in a network, allowing simultaneous access from "local" points of presence, which can span different time zones. The local access allows for fast information exchange without a single point in the network becoming a bottleneck. Additionally, the multiple copies of a database provide data backup for disaster recovery. Although these distributed database solutions are useful, they never the less have several challenges and some shortcomings.

One challenge is that the data in distributed databases changes during usage at the different points of presence in the network. These changes must be communicated to the other database systems to ensure the data timeliness and integrity. Ann example of a distributed database application is a distributed problem management system. Continuing further, suppose an end user has been helped with a notebook problem through a help desk management system at a first geographic location. Later the same end user while traveling requires further assistance regarding the same notebook problem. It is desirable for the help desk management system at a second location to be able access the activity located at the first geographic location. The challenge in this example is that if the distributed databases are not keep synchronized the end user asking for help will be asked to re-explain the history of the problem each time a call is made. Additionally, the help desk operator will not have the benefit of knowing what was tried or suggested in the past. Accordingly, a need exists for a bridging method and system to keep multiple copies of help desk database information accurate as changes are being made to different copies of the data at different database locations.

Another challenge with prior art distributed help desk solutions is the synchronization of problems between two or more companies. For example, with a printer problem, an end user may contact the printer company's help desk. After being directed to try several fixes to the problem it may turn out that the problem may not be with the printer hardware but rather with the printer software. When the end user contacts the software company the user typically must explain the entire problem again. Accordingly, a need exists for a bridging application to enable cooperation between collaborative companies and their databases so as to better server their customers.

Another shortcoming to the distributed databases being at different companies is that the databases may be designed using different database schemas. In fact the databases may not even be from the same provider e.g. IBM DB/2 versus Oracle. Accordingly, a need exists for a bridging application that can work with different database products using different database schemas.

Another shortcoming to the distributed databases being at different companies is that the databases may contain additional relevant information for a given record. This information may be considered sensitive or even confidential. Accordingly, a need exists for a bridging application to be able to exchange parts of databases between different companies without exposing sensitive or confidential entries.

One solution known in the prior art for overcoming the shortcomings is the use of time stamps for managing updates between databases.

TIME STAMP TAG FOR RECORD CONTROL BETWEEN DATABASES

Turning now to FIG. 1, there is shown a flow diagram 100, illustrating the prior art of controlling distributed databases with the use of a time stamp. The flow is entered at step 102 when there is a need at step 104 to append database record in database #1 306. (Described below) The database record is appended at step 106. A time stamp is attached, at step 108 to the record. If there are no additional changes required at step 110 the flow exits at step 112. If there are additional changes at step 110 the flow is reentered at step 106 when the next record is appended, and the flow continues.

BRIDGE APPLICATION USING A TIME STAMP TAG BETWEEN DATABASES

Turning now to FIG. 2 there is shown a flow diagram 200, which illustrates the bridging application reconciling remote databases, according to prior art. The flow is entered at step 202 when a bridge application is called to reconcile data at step 204, between all the databases. The bridge application selects a first database to be reconciled at step 206. A query is performed on the first database for any records, to be sent to other databases, at step 208, by comparing the time stamps of the records that have not been sent since the time of the last reconciling between databases. The result of the query is sent to the appropriate remote database(s) at step 210. The remote database(s) receives the result of the query at step 212, and append the received data to its database along with the time stamp. In addition the remote database adjusts the time of synchronization from the first database. The bridge application (not shown) then determines if it has completed the synchronization on all of the databases at step 214. If the synchronization is complete the functional flow exits at step 216. If the bridge application determines that there is additional database to be synchronized at step 214, the functional flow diagram is reentered at step 208. This flow is repeated until the last remote database is reconciled under the control of the bridging application and the flow exits at step 216.

This prior art time stamps method has several shortcomings. The use of time stamps by different organizations in different locations presents a classical coherency problem. Issues such as local time, daylight savings times offsets, the accuracy and diligence of local operators are only some of the problems for a bridging application. In addition, the opportunity exists for an accidental or malicious operator to adjust the local system clock, which will cause miss synchronization. Distributed databases that are not synchronized can consist of records not sent and reconciled; records sent that have already been sent wasting bandwidth, and perhaps duplicating entries at the sent to database. Accordingly, a need exists for a better method to keep track of the records between remote collaborative databases without the use of the time stamps.

One classical method for time synchronization is for all locations to use GMT (Greenwich Median Time). This is used by the broadcast industry. However the setting and synchronization to yet another location brings still additional problems that must be accounted for. That is, each location must have the correct local time and know the correct offset back to Greenwich England. This solution introduces an additional time offset, which is problematic. Accordingly, a need exists for a method to keep track of the records between remote collaborative databases that are time independent.

Another shortcoming is the frequency and amount of time that is used in synchronizing the databases. It is impractical to send the full database frequently and perform a local compare to check that the distributed databases are synchronized. This method consumes too much network bandwidth and storage. Additionally during the times of reconciling many times the database is "off line". Accordingly, a need exists for a method and system for bridging and transferring only the additions to the database between the different databases, which allows for the timely updates between the distributed databases.

There are prior art solutions that eliminate duplication of records by using timestamps on records and sending only those that have a timestamp greater than that of a certain cached time value. The time value being the timestamp at which the records were last bridged. This has a disadvantage of requiring the bridging application to store a threshold timestamp after each synchronization and hence entering a maintenance state that can slow down the application, as it has to write to disk from time to time. It also has a potential time synchronization problem, as timestamps are usually not absolute but rather relative. If the systems being bridged were physically in different time zones, the meaning of a timestamp can be confusing to the bridging application and hence erroneous in the goal of eliminating duplicate records. This can happen even in spite of using GMT. During the times of clock changes, such as from daylight savings to standard time, confusion can result. Also, someone can inadvertently or maliciously change the time on the bridging application machine at a certain point of time, which will cause the bridging program to use a wrong threshold timestamp to judge which records to send across. Accordingly, a need exists for a solution that does not rely on time stamps to the bridge records between distributed databases.

SUMMARY OF THE INVENTION

Briefly, according to the present invention, disclosed is a method, an apparatus and computer readable medium for automating the synchronization of data that resides on multiple collaborative databases. Described here is a method for exchanging only records that are needed to accomplish the updates, while preserving the individual database schema and security of the different databases.

The present invention uses three fields to describe work accomplished on a given problem. They are a problem identifier, a work identifier and a work description. The first two are numbers. The work identifier being sequential as applied to a given problem identifier. When work is applied to a problem identifier, the work description is entered in text form and the work identifier is incremented. In order to maintain synchronization with the other databases a bridging application will send the newly appended entries. When this has been completed a work entry of a predetermined text string is added, such as "copy sent to system", where the system is the name of the system that was bridged. This marks the point in the database, above which, all database entries also exist at the bridged database. This removes the time dependency with an event based label while preserving the different database schema.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention will be apparent from the following detailed description taken in conjunction with the accompanying drawings.

FIG. 6A is a table of WORK_HISTORY at a first database server #1 according to the present invention.

FIG. 6B is a table of WORK_HISTORY at a second database server # N for the same work-flow as described in FIG. 6A, according to the present invention.

DETAILED DESCRIPTION OF AN EMBODIMENT

Figure 1:
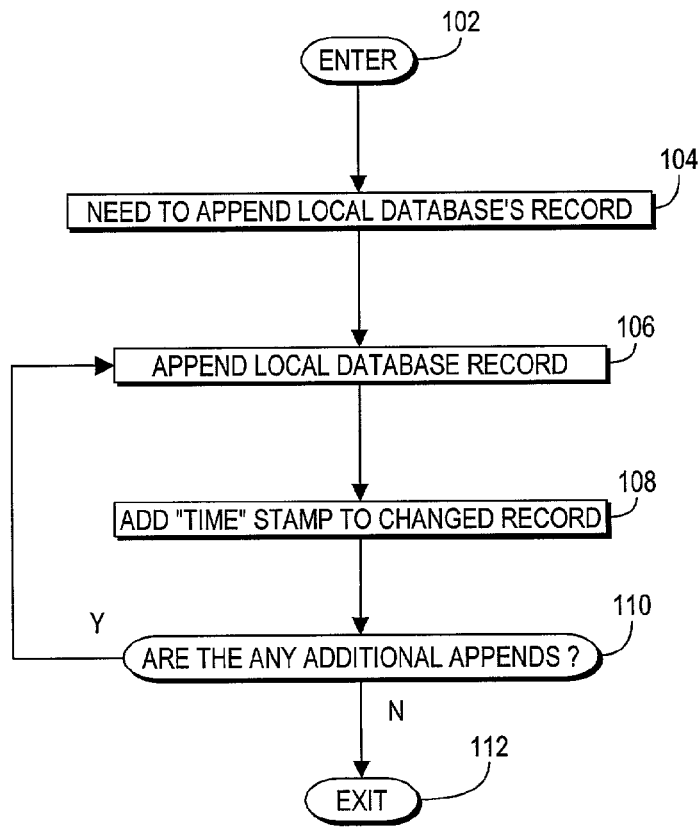
FIG. 1 is a flow diagram describing the prior art of the use of a time-stamp when a database is appended.
Figure 2:
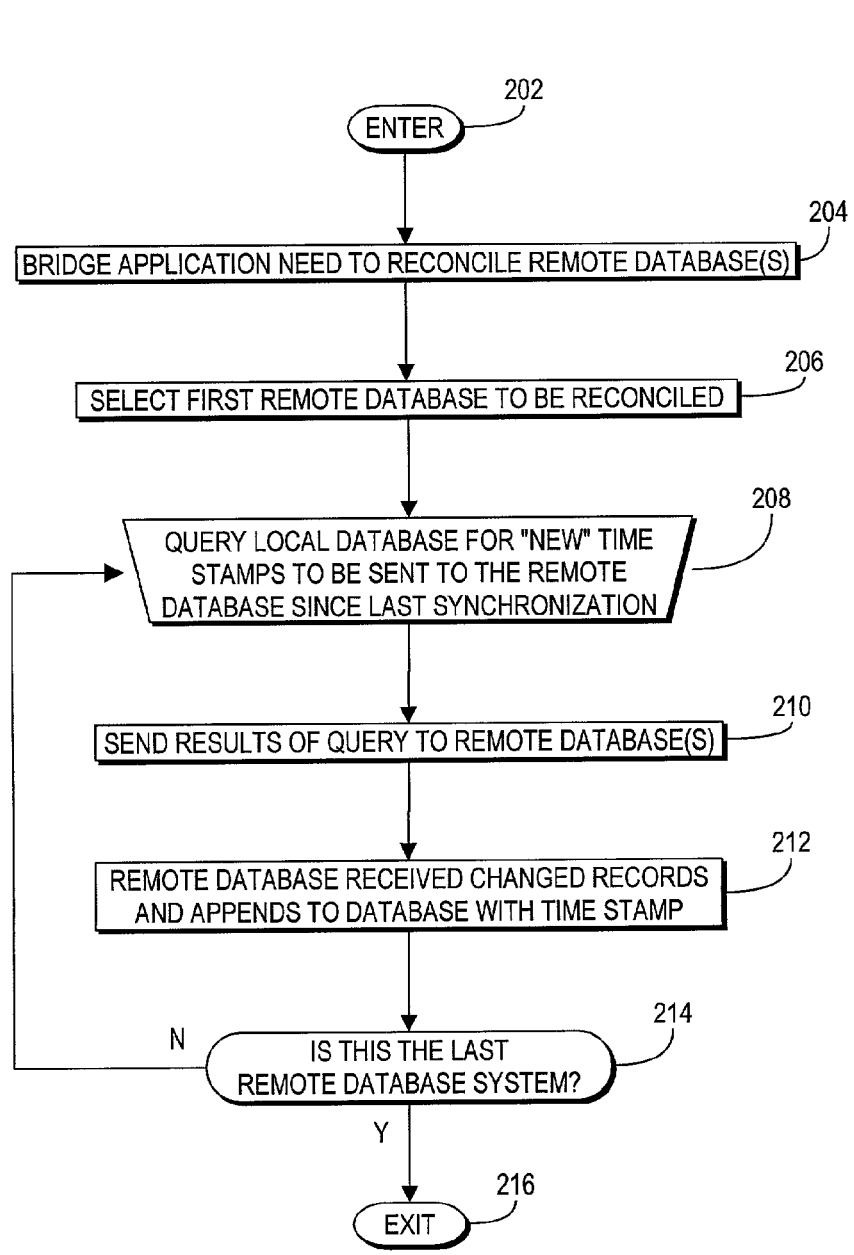
FIG. 2 is flow diagram of the prior art of the use of time-stamps by a database bridge application to reconcile remote databases.

It is important to note, that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and visa versa with no loss of generality.

In the drawing like numerals refer to like parts through several views.

EXAMPLE NETWORK TOPOLOGY

Figure 3:
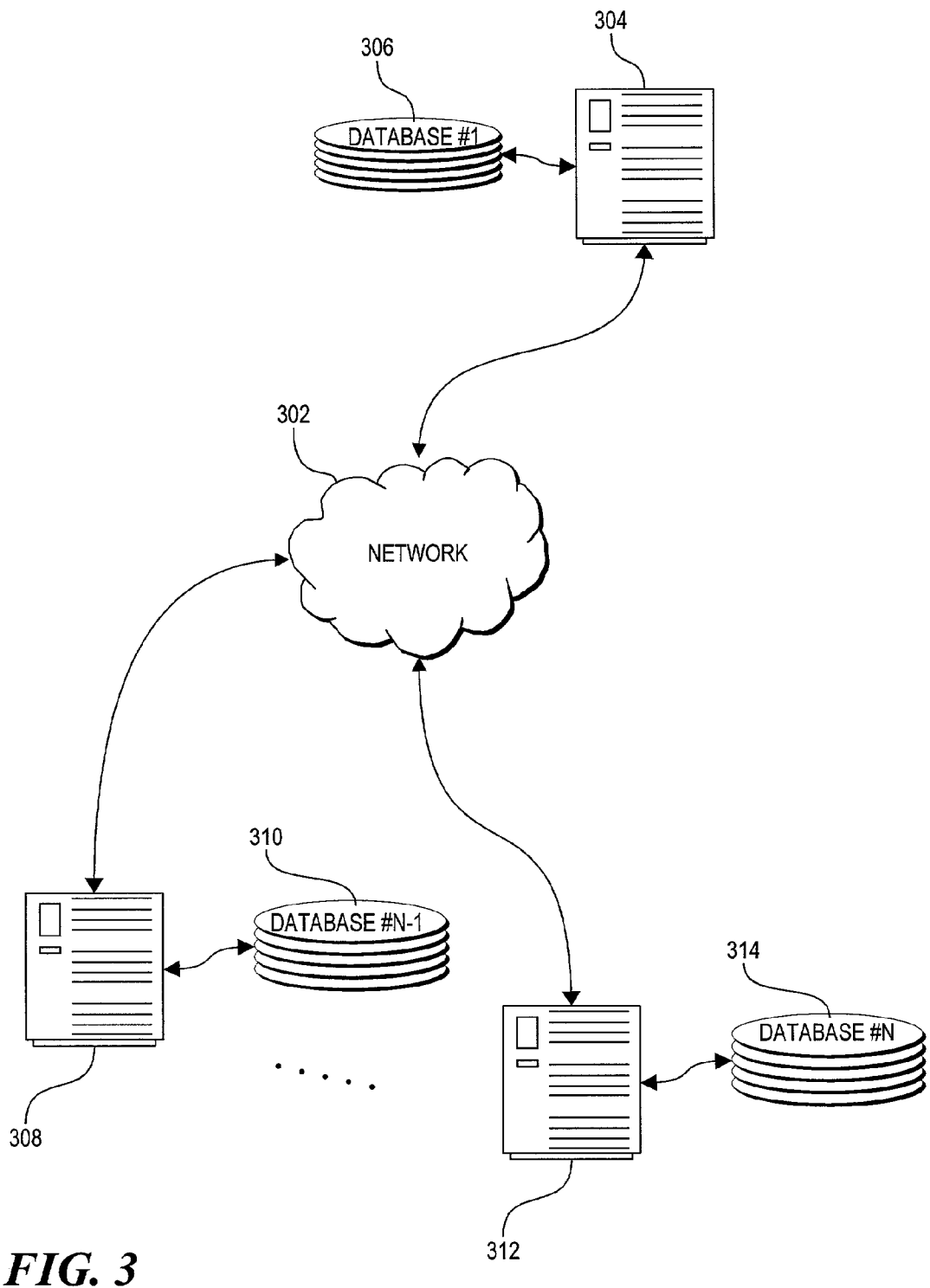
FIG. 3 is a block diagram of an exemplary network, which interconnects informational systems, according to the present invention.

Referring to FIG. 3, shown is a block diagram 300 of a network of computers. The network 302 can be a private Intranet, Internet or other computer network such as a LAN (Local Area Network). The network is typically the Internet and the interconnection software protocol is HTTP (Hyper Text Transfer Protocol). The exact network or its hardware/software protocol is not important to the present invention, and other networks are within the true scope and spirit of the present invention. This exemplary network depicts 1–N database servers as follows: server #1 104, which hosts database # 1 106, server #N−1 108 which hosts database # N−1 110, and server # N 112 which hosts database #N 114.

The databases #1 through #N represent a plurality of servers which are hosting the same or at least collaborative databases 304, 310, and 314. These servers may be in widely different geographical areas throughout the world. In one embodiment these databases are accessed when information relative to a help desk, or e-commerce, such as commerce over the Internet is desired. In the example above, after the help desk operator accesses a help desk management system through a local database server the results of the help session are appended in the local database. The local record is not synchronized across the other databases. This results in the other databases becoming unsynchronized. A bridging application is used to transfer the help desk information to the other database servers so this information, known as a trouble ticket can be accessed at the other location. Continuing with the example above, if the end user with the problem goes on a trip it is advantageous to be able to access the help desk management system from a different geographic location, or even by contacting a different company.

Exemplary Computer System

Figure 4:
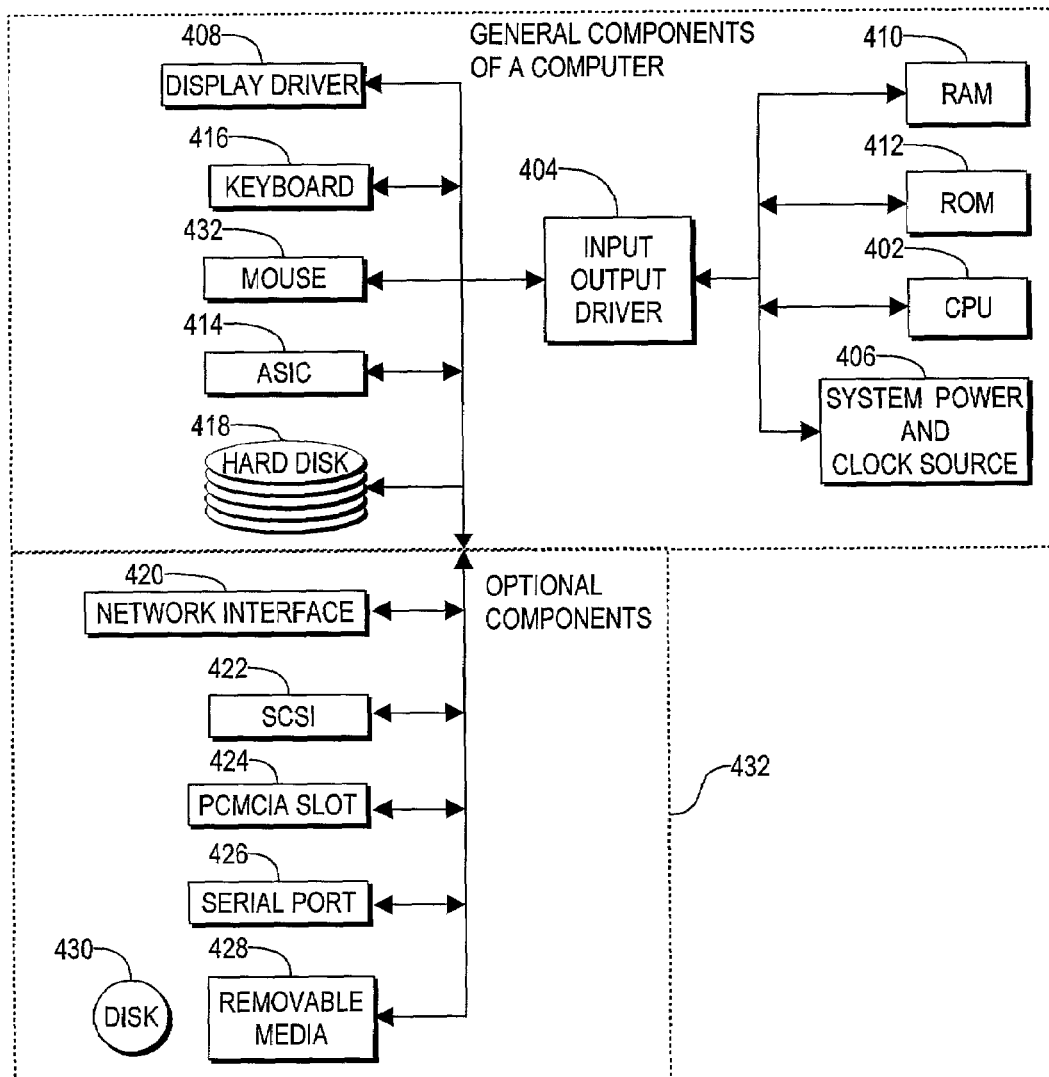
FIG. 4 is block diagram of an exemplary hardware platform with optional components, which is used by the present invention.

Referring to FIG. 4, there is shown a block diagram 400 of the major electronic components of an information processing system 400 in accordance with the invention. The electronic components include: a central processing unit (CPU) 402, an Input/Output (I/O) Controller 404, a mouse 432 a keyboard 416, a system power and clock source 406; display driver 408; RAM 410, ROM 412, ASIC (Application Specific Integrated Circuit) 414 and a hard disk drive 418. These are representative components of a computer. The general operation of a computer comprising these elements is well understood. Network interface 420 provides connection to a computer network such as Ethernet over TCP/IP or other popular protocol network interfaces. Optional components for interfacing to external peripherals include: a Small Computer Systems Interface (SCSI) port 422 for attaching peripherals; a PCMCIA slot 424; and serial port 426. An optional diskette drive 428 is shown for loading or saving code to removable diskettes 430. The system 400 may be implemented by combination of hardware and software. Moreover, the functionality required for using the invention may be embodied in computer-readable media (such as 3.5 inch diskette 430) to be used in programming an information-processing apparatus (e.g., a database server) to perform in accordance with the invention.

Given this computer system, the typical Software Operating System and associated supporting applications can be installed which will simulate and display the results according to the present invention.

EXEMPLARY SOFTWARE HIERARCHY

Figure 5:
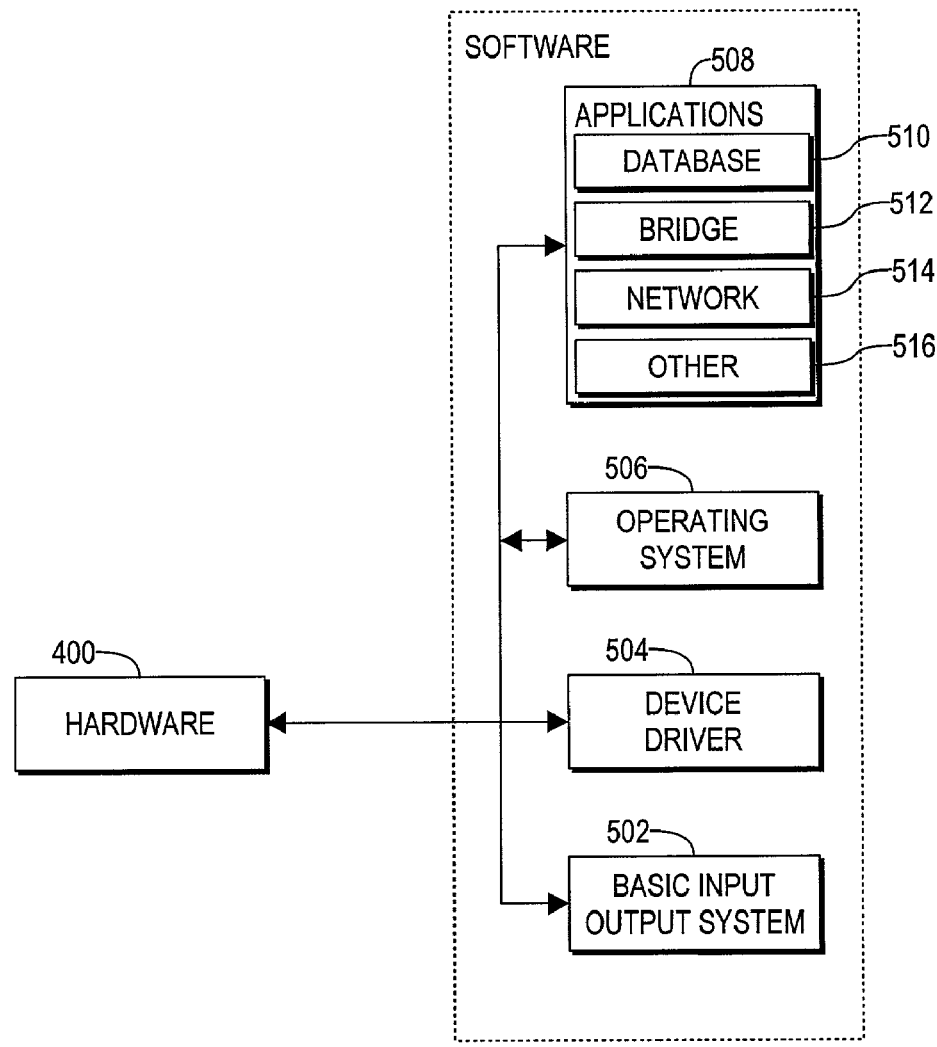
FIG. 5 is a block diagram of an exemplary software hierarchy including the present invention that is executed on the hardware of FIG. 4.

FIG. 5 is a block diagram 500, illustrating the software hierarchy for the information processing system 400 of FIG. 4 according to the present invention. The BIOS (Basic Input Output System) 502 is a set of low level of computer hardware instructions for communications between an operating system 506, device driver 504 and hardware 400. Device drivers 504 are hardware specific code used to communicate between and operating system 506 and hardware peripherals such as a CD ROM drive or printer. Operating system 506 is the master program that loads after BIOS 502 initializes, that controls and runs the hardware 400. Examples of operating systems include Windows 3.1/95/98/ME/2000/NT, Unix, Macintosh, OS/2, Sun Solaris and equivalents. Applications 508 are software application programs written in C/C++, assembler or other programming languages. Examples of application are a database 510, a bridge application according to the present application 512, a network connectivity application such as is used for the internet and other applications 516 such as word processors and the like.

DISCUSSION OF HARDWARE AND SOFTWARE IMPLEMENTATIONS OPTIONS

The present invention as would be known to one of ordinary skill in the art could be produced in hardware or software, or in a combination of hardware and software. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in art.

According to the inventive principles as disclosed in connection with the preferred embodiment, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer, as would be known to one of ordinary skill in the art. The computer medium, which may be used to hold or contain the computer program product, may be a fixture of the computer such as an embedded memory or may be on a transportable medium such as a disk, as would be known to one of ordinary skill in the art.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, Flash memory, floppy disk, Disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network, that allow a computer to read such computer readable information.

SOFTWARW OVERVIEW

The present invention is a distributed computer program that will synchronize collaborative databases. That is databases that are not exact mirror images of each other, and in fact may contain proprietary data that is to be kept confidential and separate from the other databases. The bridging software must be installed at each database location and be aware of the other locations that are to be synchronized.

BRIDGING APPLICATION DESCRIPTION

The bridging software saves storage space by not storing duplicate records at different locations, providing for only one synchronized copy of the data at each location. The bridging software also saves bandwidth by not sending data that already exists or has already been sent to the other system. This is achieved by appending an existing record entry in the local database. This event record is a bridging application definition such as "copy in sent-to-system". This entry in the workflow marks the event of synchronizing with the correct remote databases. At the time of the next synchronization any new entries after the workflow entry "copy in sent-to-system" are synchronized but no "old" workflow entries are sent as they occurred before the "copy in sent-to-system" event record. That is, the bridging application only picks up the workflow records to be synchronized that follow the tag, "copy in sent-to-system". After sending these records, the present invention immediately inserts another tag. This tag marks the event of the just sent records that now also exist in the remote system.

TIVOLI SERVICE DESK EXAMPLE

In one embodiment this method has been advantageously used in bridging two IBM Tivoli Service Desk (TSD) problem management databases. These systems each have a WORK_HISTORY table that contains descriptions and notes of the work performed by a customer service representative during the life of a particular user problem.

EXAMPLE OF WORK HISTORY ENTRIES AT TWO DIFFERENT DATABASSES

Turning now to FIG. 6A, shown is a table 600 for a WORK_HISTORY for a illustrative help desk enterprise in a database #1 106 for PROBLEM_ID ABC. Each database entry has locally based additional entries for each record that are treated as separate and confidential by the bridging application. These are not shown. Column 602 contains the WORK_ID for the PROBLEM_ID ABC. Note that at this database #1 106 there are numerous entries being made by numerous help desk operators. What is shown here are only the entries for PROBLEM_ID ABC. The WORK_ID has entries that are locally sequential, starting at 1 610 and ending at 8 626 Column 604 contains the PROBLEM_ID ABC. In this example this is a problem ticket ID for a help desk management system, and identifies a set of symptoms and the suggested solution given to the end user that has called in with a problem. Column 606 contains the WORK_HISTORY, which is a list of appendable text entries. One can read this column and understand the various actions that have been taken for the PROBLEM_ID ABC. Note the lack of any time stamps. Also note that the schema of the local database in not changed, that is these record entries already existed before the implementation of the present invention.

In FIG. 6A, a record 610 contains the first entry, as WORK_ID 1. The WORK_HISTORY column 606 includes the entry "open ticket for analysis". It would also list the problem as described by the end user that has called in. Record 612 contains the second entry, which is WORK_ID 2. The WORK_HISTORY has the entry "solve ticket ABC". In this example, a help desk operator at database #1 306 believes that the problem has been solved and lists the problem as closed.

At this point in time the bridging application sends all WORK_HISTORY entries to the other database such as # N 312 to assure that anyone calling in on this PROBLEM_ID ABC will have the benefit of the work done to date. Note that only the WORK_HISTORY, PROBLEM_ID and WORK_ID are sent. The other records which may be confidential are not sent, or even accessed by the bridging application. Therefore the entry "copy in system # N" is entered at record 614. This problem however is persistent and the help desk is contacted again with WORK_ID 4 record 616. The help desk operator, which may not be the original operator can now reopen the problem ticket, read the previous history and suggest additional solutions. This is listed in the WORK_HISTORY as "reopen ABC for review" 616. This WORK_ID 4 is then sent to database # N 312 and as such the work history entry "copy in system # N" is listed 618. In the present invention for this problem ticket ABC, it is important to note that only new records are sent. Therefore WORK_IDs 1 through 3 are not sent. Only the WORK_ID 4 is sent.

At this point in time the PROBLEM_ID is considered open and being worked on at database #1 306 and # N 312. An operator at database # N 312 is contacted by the user about problem ticket ABC. In this example the help desk operator may decide that the problem may be with the operating system and not with the hardware at database # 1 so calling the software operating system company is in order. Note that the help desk operator at database # N is working on the problem so the entry "do not bother will work on ABC at # N" is entered at database # N and bridged back to database # 1, at the hardware company. The help desk operator at database # N (the software company) has the benefit of all of the work done up to this point on PROBLEM_ID ABC. It is also noted that the help desk operator at database # N may have different skills and perspectives relative to the problem. In this embodiment only problem history records are shared between the databases and the other entries in the database records are not shared.

At this point in time the operator at database # 1 lists "solved !" at WORK_ID 8 record 624. This entry is followed with the entry "copy in system # N" record 626 at WORK_ID 9, which alerts the operator at database #N that the problem is solved and the problem ticket ABC is closed.

This completes the description of the bridging application's actions from the perspective of database #1 306.

Turning now to FIG. 6B, table 650 lists the WORK_HISTORY for the same PROBLEM_ID ABC as listed at database # N 314 according to the present invention. At this location there are additional entries to each record from the perspective of a software company. As with database # 1 306, these are not shown but are considered as local and are not transferred by the present invention, a bridging application. Column 630 contains the WORK_ID for the PROB- LEM_ID ABC at database # N 314. Column 632 contains the PROBLEM_ID, which in this example is ABC. Column 634 contains the text of the appended work statements for the listed PROBLEM_ID. At database #N 314 records 636, and 638 were received from database #1 306. This work was done by a help desk operator at database # 1 306. Note that the entries "copy in system # N" records 614 and 618 are not transferred as they are the entries that mark what WORK_HISTORY records have been transferred and are entered only after the latest entries are entered.

Now at record 640, the help desk operator at database # N has received the WORK_ID 1 and 2 and thereafter enters WORK_ID 3 as "Copy in System # 1".

Now at record 642, the help desk operator at database # N 314 has been contacted, by the end user and the help desk operator has the benefit of the work history done at database # 1. These are WORK_ID 1 and 2. The help desk operator at database # N 314 makes the entry "reopen ABC for review"" record 642. After this was entered it was sent by the bridging application to database # 1 306 and is listed in the WORK_HISTORY as "copy in system # 1" record 644.

Now the help desk operator at database # 1 306 is alerted that the operator at database # N 312 is also working on this problem ABC with the message "do bother will work on ABC@ # N", which is WORK_ID 6 record 646. This message is sent with the WORK_ID 7 "copy in system # 1" record 648.

However, at this point in time the help desk operator at database # 1 106 has discovered the solution to the problem ABC and makes the entry "solved !", at record 624. Finally the bridging application sends this entry 624 to database # N 112 and this is listed as record 650. The database # N sends the message "copy in system # 1" back to database # 1, this being WORK_ID 9, which acknowledges that the problem ABC has been solved at record 650 by the help desk operator at database # 1.

This completes the description of the WORK_HISTORY for PROBLEM_ID ABC at database # N 112.

APPENDING WORK HISTORY IN LOCAL DATABASE

Figure 7:
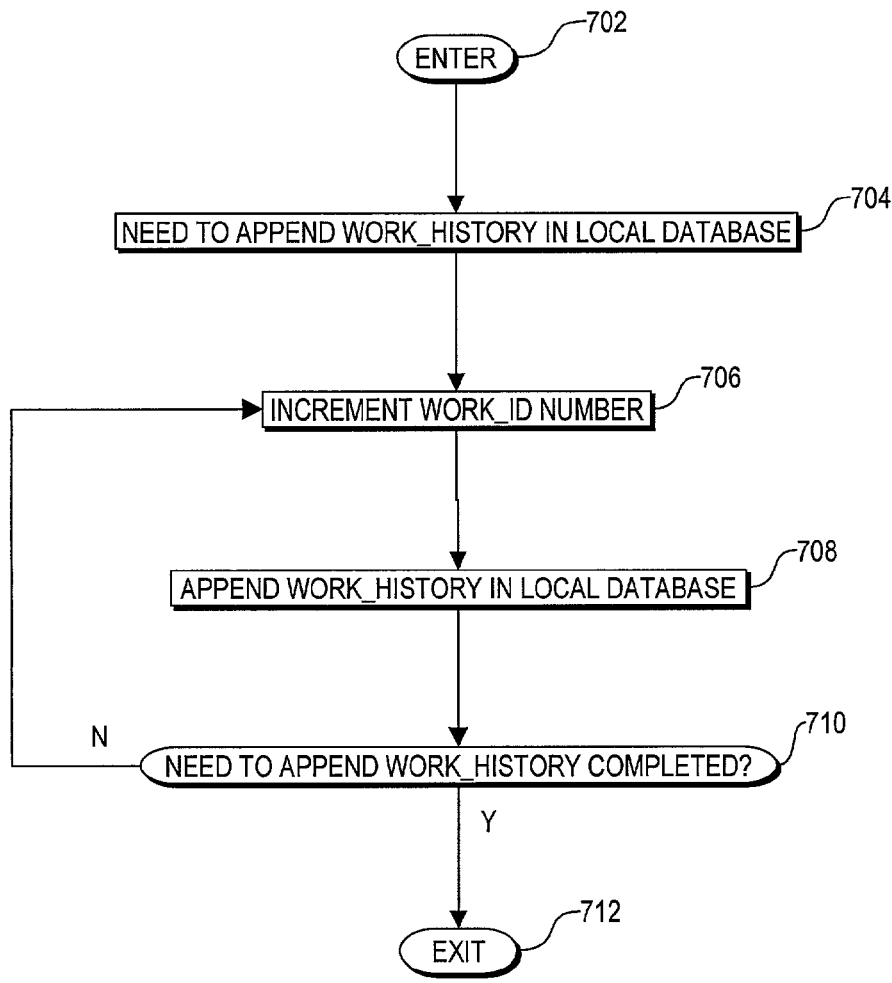
FIG. 7 is a flow diagram describing the need to append the WORK_HISTORY in a local database, according to the present invention.

FIG. 7 is a flow diagram 700, which describes entering work completed on a problem at a local database such as # 1 106. The flow is entered 702 when there is a need to describe or append work in the WORK_HISTORY 606 in the local database at step 704. For this next sequential record WORK_ID number 602 is incremented by 1 at step 706. With this in place for a given PROBLEM_ID 604 the WORK_HISTORY can be appended at step 708. This entry is simply a statement of the latest work attempted in text form. If the need to append the WORK_HISTORY is completed at step 710 the flow exits at step 712. In the case there are additional entries to be appended at step 710 a new record is opened, and the flow is reentered at step 706. Summarized here, for each PROBLEM_ID the WORK_ID lists in numerical sequence all work as listed in the WORK_HISTORY field. If anyone local to this database would like to look at a problem, and the work done on it, the database can be accessed. However, if a different database, in a different location or even hosted by a different company would like to access this information it must be sent or bridged to these databases such as # N−1 310 and # N 314.

DATABASE SYNCHRONIZATION

Figure 8:
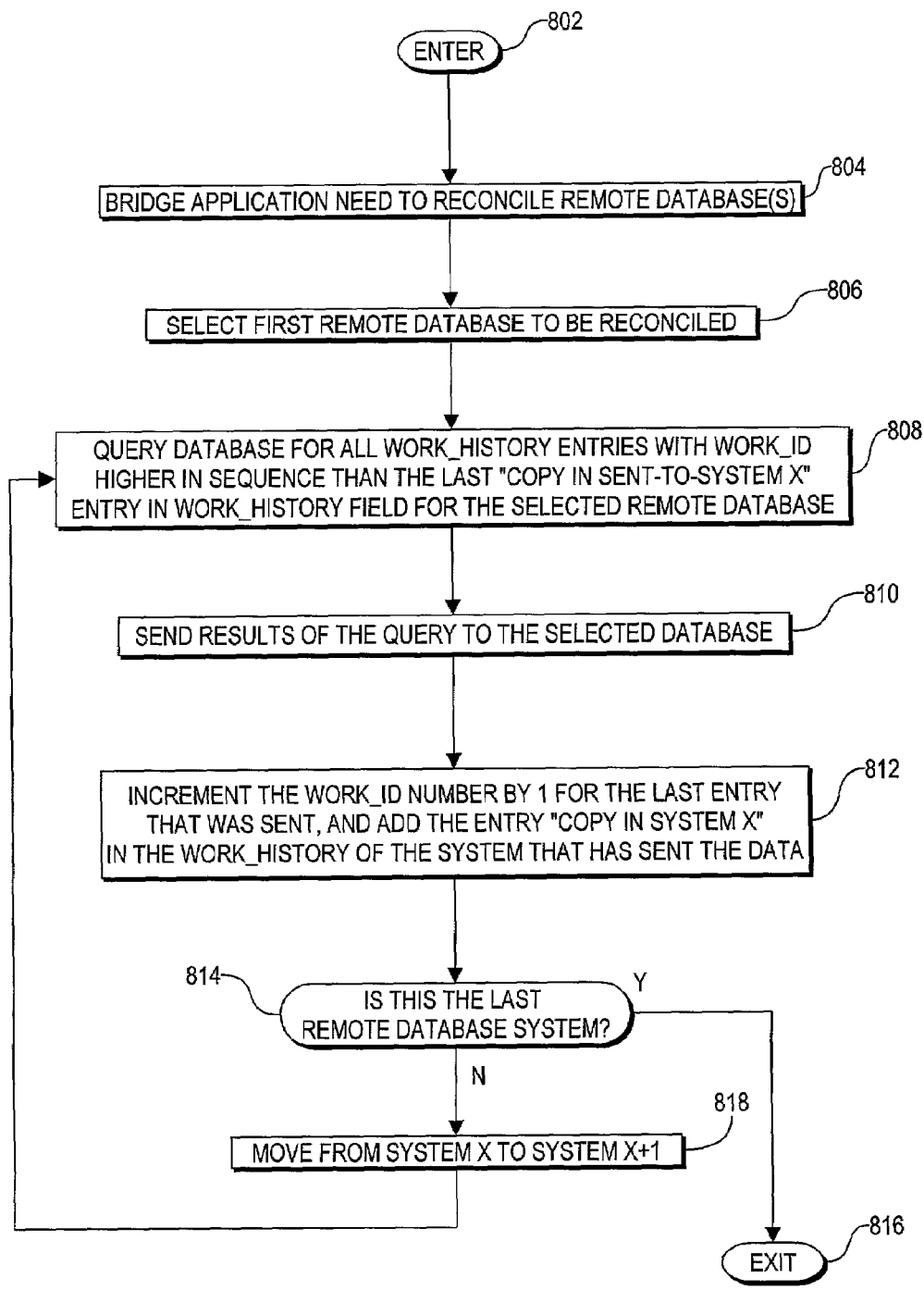
FIG. 8 is a flow diagram of the reconciling of newly appended records with remote database servers by the bridging application, according to the present invention.

Turning now to FIG. 8, which describes the flow 800 design of the bridging application, according to the present invention. The flow is entered at step 802 when the bridge application needs to reconcile remote the database(s). The bridging application chooses the first remote database # N−1 310 to be reconciled with the local database #1 306 at step 806. A query of the local database # 1 306 for all WORK_HISTORY entries with WORK_ID numbers higher in sequence that the record which contains the entry "copy in sent-to-system X" (X being N−1 for this first step) entry in WORK_HISTORY field for the selected remote database at step 808 is made. As a result of this query a list is assembled and is sent to the selected remote database # N−1 310 at step 810.

After the new list of WORK_HISTORY is sent at step 810, the local database # 1 306 appends the entry "copy in system X" in the WORK_HISTORY field against the PROBLEM_ID that was sent and adds the next number in sequence in the WORK_ID field for this record at step 812. This entry acts as a time independent statement of which records have been sent to the remote database # N−1 310. If there are no additional database systems that need to be reconciled at step 814 the flow exists at step 816. If there are additional remote databases that need reconciling, such as database # N 314, the number of system X is changed to N at step 818 and the flow is reentered at step 808.

It is noted that the bridging application is also installed at the remote databases and they must reconcile their WORK_HISTORY records with the other databases.

In an alternative embodiment after synchronization records are transferred any work lists control records that are less that the WORK_ID sequence listing the just synchronized entry are deleted at the different databases for the give Problem_ID.

NON-LIMITING EXAMPLES

Although a specific embodiment of the invention has been disclosed. It will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

The present invention provides for time independent synchronization of database records between remote servers that may choose to maintain different schema and even have parts of the database be considered confidential.

The invention claimed is:

1. A method for synchronizing database records from database servers networked to at least one other database server comprising collaborative database information records, the method comprising:

selecting at least one remote database server;

accessing locally on a first database server, at least one database record in a first database, wherein the database record includes at least one field for each of a sequence number field, a problem identifier field, and a work history field;

searching for at least one database record in the first database with a value in the work history field matching a predetermined value, wherein the work history field comprises at least one description of a particular user's problem;

using a sequence value within the sequence number field in the at least one database record in the first database with the value in the work history field matching the predetermined value as a starting point for synchronization with the remote database server, wherein the sequence value in the sequence number field of the at least one database record is associated with the at least one database record;

sending to the remote database server each database record in the first database whose associated sequence number in the sequence number field is greater than the sequence value, wherein data included in each database record is new and distinct over existing information residing in the remote database server;

appending a least one new database record directly into the first database with a new value in the work history field matching the predetermined value; and storing a new sequence number directly in a sequence number field of the at least one new database record in the first database, wherein the new sequence number is an increment of a final sequence number of a final database record sent to the remote database.

2. The method of claim 1, wherein the searching for at least one database record in the first database with a value in the work history field matching a predetermined value includes searching for a predetermined entry which does not include a time entry.

3. The method of claim 1, wherein the sending to the remote database server each database record in the first database whose associated sequence number in the sequence number field is greater than the sequence value includes sending each database record for customer service information.

4. The method of claim 1, wherein the sending to the remote database server each database record in the first database whose sequence number in the sequence number field is greater than the sequence value includes sending each database record for a help desk application.

5. The method according to claim 1, wherein the sending to the remote database server each database record in the first database whose associated sequence number in the sequence number field is greater than the sequence value includes sending to the remote data base server with a second database schema that is different than a first database schema for the first database server.

6. The method according to claim 5, wherein the sending to the remote database server each database record in the first database whose associated sequence number in the sequence number field is greater than the sequence value includes sending to the remote data base server at least one database record from the first database server with the first database schema that has been previously designated as non-confidential.

7. A computer readable medium for synchronizing database records comprising programming instructions for execution with database servers networked to at least one other database server comprising collaborative database information records, the programming instructions comprising:

selecting at least one remote database server;

accessing locally on a first database server, at least one database record in a first database, wherein the database record includes at least one field for each of a sequence number field, a problem identifier field, and a work history field;

searching for at least one database record in the first database with a value in the work history field matching a predetermined value, wherein the work history field comprises at least one description of a particular user's problem;

using a sequence value within the sequence number field in the at least one database record in the first database with the predetermined value as a starting point for synchronization with the remote database server, wherein the sequence value in the sequence number field of the at least one database record is associated with the at least one database record;

sending to the remote database server each database record in the first database whose associated sequence number in the sequence number field is greater than the sequence value, wherein data included in each database record is new and distinct over existing information residing in the remote database server;

appending at least one new database record directly into the first database with a new value in the work history field matching the predetermined value; and storing a new sequence number directly in a sequence number field of the at least one new database record in the first database, wherein the new sequence number is an increment of a final sequence number of a final database record sent to the remote database.

8. The computer readable medium of claim 7, wherein the programming instruction for searching for at least one database record in the first database with a value in the work history field matching a predetermined value includes searching for a predetermined entry which does not include a time entry.

9. The computer readable medium of claim 7, wherein the programming instruction for sending to the remote database server each database record in the first database whose associated sequence number in the sequence number field is greater than the sequence value includes sending each database record for customer service information.

10. The computer readable medium of claim 7, wherein the programming instruction for sending to the remote database server each database record in the first database whose associated sequence number in the sequence number field is greater than the sequence value includes sending each database record for a help desk application.

11. The computer readable medium of claim 7, wherein the programming instruction for sending to the remote database server each database record in the first database whose associated sequence number in the sequence number field is greater than the sequence value includes sending to the remote data base server with a second database schema that is different than a first database schema for the first database server.

12. The computer readable medium of claim 7, wherein the programming instruction for sending to the remote database server each database record in the first database whose associated sequence number in the sequence number field is greater than the sequence value includes sending to the remote data base server at least one database record from the first database server with the first database schema that has been previously designated as non-confidential.

13. A data processing enterprise for synchronizing database records, the data processing enterprise having at least two processing elements networked together, comprising:

at least a first database server having at least one database record in a first database, wherein each database record includes at least one field for each of a sequence number field, a problem identifier field, and a work history field;

a bridge program for communicating with the first database server including a means for performing:

selecting at least one remote database server;

searching for at least one database record in the first database with a value in the work history field matching a predetermined value, wherein the work history field comprises at least one description of a particular user's problem;

using a sequence value within the sequence number field in the at least one database record in the first database with the value in the work history field matching the predetermined value as a starting point for synchronization with the remote database server, wherein the sequence value in the sequence number field of the at least one database record is associated with the at least one database record;

sending to the remote database server each database record in the first database whose associated sequence number in the sequence number field is greater than the sequence value, wherein data included in each database record is new and distinct over existing information residing in the remote database server;

appending at least one new database record directly into the first database with a new value in the work history field matching the predetermined value; and storing a new sequence number directly in a sequence number field of the at least one new database record in the first database, wherein the new sequence number is an increment of a final sequence number of a final database record sent to the remote database.

14. The data processing enterprise of claim 13, wherein the searching for at least one database record in the first database with a value in the work history field matching a predetermined value includes searching for a predetermined entry which does not include a time entry.

15. The data processing enterprise of claim 13, wherein the sending to the remote database server each database record in the first database whose associated sequence number in the sequence number field is greater than the sequence value includes sending each database record for customer service information.

16. The data processing enterprise of claim 13, wherein the sending to the remote database server each database record in the first database whose associated sequence number in the sequence number field is greater than the sequence value includes sending each database record for a help desk application.

17. The data processing enterprise of claim 13, wherein the sending to the remote database server each database record in the first database whose associated sequence number in the sequence number field is greater than the sequence value includes sending to the remote data base server with a second database schema that is different than a first database schema for the first database server.

18. The data processing enterprise of claim 13, wherein the sending to the remote database server each database record in the first database whose associated sequence number in the sequence number field is greater than the sequence value includes sending to the remote data base server at least one database record from the first database server with the first database schema that has been previously designated as non-confidential.

* * * * *